March 19, 1940 L. B. M. BUCHANAN Re. 21,401

REFRIGERATING APPARATUS

Original Filed Jan. 28, 1937

WITNESSES:

R. J. Ridgeley
E. Lutz.

INVENTOR
LESLIE B. M. BUCHANAN.

BY W. L. Steigw
ATTORNEY

Reissued Mar. 19, 1940 Re. 21,401

UNITED STATES PATENT OFFICE 21,401

REFRIGERATING APPARATUS

Leslie B. M. Buchanan, Springfield, Mass., assignor to Westinghouse Electric & Manufacturing Company, East Pittsburgh, Pa., a corporation of Pennsylvania Original No. 2,123,179, dated July 12, 1938, Serial No. 122,716, January 28, 1937. Application for reissue December 30, 1939, Serial No. 311,925

13 Claims. (Cl. 62—115)

My invention relates to multiple evaporator refrigerating systems and has for an object to provide improved systems of this kind.

A further object of the invention is to provide an improved method and apparatus for distributing condensed refrigerant to the evaporators of a multiple evaporator system in which capillary or other fixed orifice expansion devices are employed.

A still further object of the invention is to provide an improved two temperature refrigerating system having evaporators operated at different temperatures and supplied with refrigerant through capillary tubes.

These and other objects are effected by my invention, as will be apparent from the following description and claims taken in connection with the accompanying drawing, forming a part of this application, in which:

Figure 1:
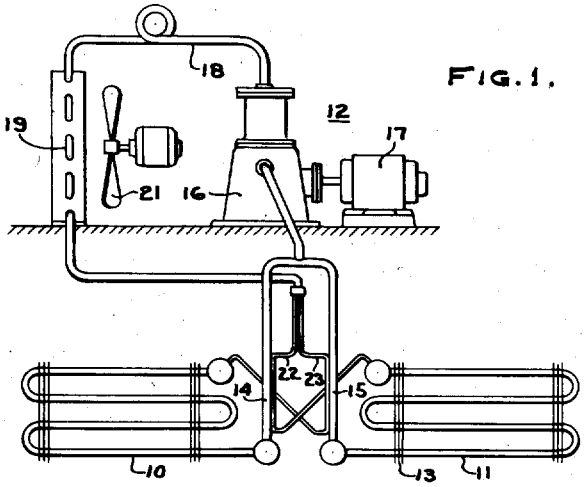
Fig. 1 is a diagrammatic view of a refrigerating system arranged in accordance with my invention.

Reference will now be had to Fig. 1 of the drawing wherein I have shown a pair of evaporators 10 and 11 supplied with refrigerant by a common condensing unit shown generally at 12. The evaporators 10 and 11 may be employed for refrigerating any medium but, as shown, operate to cool air and are, therefore, provided with fins 13. The evaporators 10 and 11 are provided with respective suction conduits 14 and 15 which connect with a conventional compressor 16 forming a part of the condensing unit 12. The compressor 16 may be driven in any suitable manner, as by a motor 17.

Refrigerant withdrawn from the evaporators 10 and 11 is compressed to a relatively high pressure by the compressor and is delivered through a conduit 18 to a condenser 19. The condenser is cooled in any suitable manner such as, for example, by a motor driven fan 21, so that the compressed vapor is condensed. Liquid refrigerant is delivered to the evaporators 10 and 11 from the condenser by means of capillary tubes 22 and 23. It will be apparent that the refrigerating system described in the foregoing operates on the well known compressor condenser expander cycle.

It is well recognized that unstable operation may be experienced in operating evaporators in parallel when capillary tubes are employed as expansion devices. The mount or weight of refrigerant passed by a capillary tube depends upon the difference in pressure between the condenser and the evaporator and upon the condition of the refrigerant passed through the tube. With respect to the latter, as the amount of gas that is present in the tube is decreased, the weight of refrigerant that is conveyed is increased. Increasing the amount of gas in the refrigerant within the tube reduces the total weight of refrigerant that is conveyed.

During the passage of refrigerant through a capillary tube, the pressure progressively decreases and vaporization of the liquid in the tube is effected. Vaporization may be retarded by reducing the temperature of the refrigerant admitted to the tube or by refrigerating the tube whereby less gas is generated during passage of the refrigerant and, therefore, a greater amount of refrigerant is delivered to the evaporator. The total amount or weight of refrigerant delivered by the tube may, therefore, be varied by varying the temperature of the refrigerant as it passes through the tube.

The other factor that affects the flow of refrigerant through the tube is the pressure differential prevailing between the ends of the tube. As is well understood, the amount of refrigerant conveyed by the tube increases as the pressure differential increases and vice versa. Other factors, such as, for example, variations in condensing temperature and pressure determine the amount of refrigerant conveyed by the tube, but it will suffice for the purpose of explaining my invention to consider only pressure differences caused by varying evaporator pressure.

In accordance with my invention, stable operation of the system described under variable load conditions is effected by subjecting the capillary tube of one evaporator to the temperature of the gas conveyed from the other evaporator. Accordingly, the tube 22 that serves the evaporator 13 is secured in heat transfer relation with the suction conduit 14 of evaporator 10, and the tube 23 of the evaporator 10 is disposed in heat transfer relation with the suction conduit 15 of the evaporator 13.

When there is an increased heat load imposed on one of the evaporators, for example, evaporator 11, vaporization in the evaporator 11 is increased and the pressure in both evaporators 10 and 11 and their suction conduits 14 and 15 increases. The amount of condensed refrigerant in the evaporator 11 is, therefore, reduced and the amount in the evaporator 10 is increased due to some condensation being effected by the higher pressure, and because less refrigerant is being vaporized in evaporator 10 at higher pressure. It will be understood that in the present embodiment the gas normally passing through the conduits 14 and 15 is in a superheated condition so that no condensation is effected in the conduit 14 unless the pressure rises to a relatively high value or to a value corresponding to the superheat temperature of the vapor in the conduit 14. Accordingly, condensation is not effected in the conduit 14 and substantially no heating thereof is effected.

At this time, the evaporator requires additional condensed refrigerant and the passage of refrigerant to the evaporator 10 should be retarded. The increase in temperature of the conduit 15 reduces the amount of heat abstracted from the capillary tube 23 so that an increase in the amount of gas therein is effected and, as described heretofore, the amount or weight of refrigerant conveyed thereby to the evaporator 10 is reduced, and the amount of liquid available for the tube 22 is increased. The condensed refrigerant in the evaporator 10 increases to such extent that liquid enters the conduit 14, and vaporization thereof is effected by the heat of the condensed refrigerant in the tube 22. This reduces the amount of gas in the tube 22 and, therefore, additional condensed refrigerant is passed to the evaporator 11, as described.

It will be apparent from the foregoing that the system is self regulating. An increase in the load on one evaporator reduces the amount or weight of refrigerant supplied to the other evaporator so that the proportion of the total amount of the circulated refrigerant that is supplied to the heavier loaded evaporator is increased. Furthermore, any overflow of condensed refrigerant into the suction conduit of the lesser loaded evaporator refrigerates the condensed refrigerant in the tube serving the heavier loaded evaporator and, as described, increases the quantity or weight of refrigerant that is conveyed to the heavier loaded evaporator. This operation, furthermore, prevents the passage of slugs of liquid refrigerant to the compressor through the suction conduit of the lesser loaded evaporator with the obvious undesirable and frequently disastrous results. It is well known that passing the vaporous refrigerant from an evaporator in heat transfer relation with the condensed refrigerant results in an increase in efficiency and it will be apparent that this desirable feature is also provided in my improved system.

Figure 2:
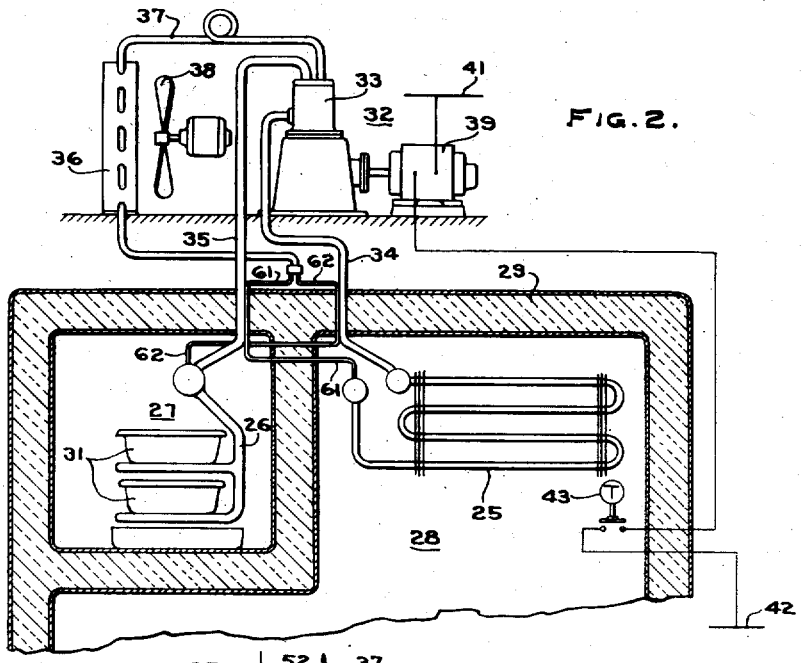
Fig. 2 is a diagrammatic view of a two temperature refrigerating system employing a compressor of the ported cylinder type and constructed and arranged in accordance with the invention.
Figure 3:
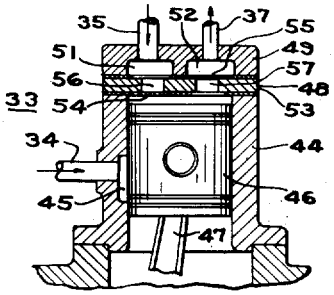
Fig. 3 is a detail view showing a compressor having a ported cylinder.

In accordance with the second embodiment of my invention, reference will be had to Figs. 2 and 3 of the drawing, wherein I have shown a two temperature refrigerating system employing relatively high and low temperature evaporators 25 and 26, respectively, disposed for cooling the air in low and high temperature cooling zones or chambers 27 and 28 that are formed within a cabinet structure shown at 29. The evaporator 25 functions to cool the air in the zone 28 and may be finned as shown, and the evaporator 26 operates to refrigerate the air in the low temperature or freezing zone 27 and to congeal fluid in trays 31.

Refrigerant is circulated by a condensing unit 32 having a multiple inlet compressor 33 which I have shown of the single ported-cylinder type. Suction conduits 34 and 35 connect the respective evaporators 25 and 26 with the compressor 33. The refrigerant vapor compressed by the compressor 33 is delivered to a condenser 36 through a conduit 37. Cooling of the condenser may be effected in any suitable manner, as by a motor driven fan 38. The compressor 33 may be driven by a motor 39 energized by conductors 41 and 42 under control of a suitable thermostat 43 which may be responsive to the temperature of one of the refrigerated zones, preferably the higher temperature zone 28.

A portion of the compressor 33 is shown in section in Fig. 3 and preferably includes a cylinder 44 that is ported as shown at 45. While I have shown a compressor of the ported cylinder type for producing two different suction pressures, it is to be understood that it has been shown by way of example and that other suitable forms of compressors may be employed. A piston 46 is disposed in the cylinder 44 and may be reciprocated therein in any well known manner such as, for example, by a connecting rod 47. The cylinder 44 is provided with a valve structure, generally indicated at 48, and a head 49, the latter being provided with inlet and outlet chambers 51 and 52, respectively. The chambers 51 and 52 communicate, respectively, with the evaporator 26 and the condenser 36 by means of the conduits 35 and 37. The port 45 in the cylinder 44 communicates with the high temperature evaporator 25 by means of the conduit 34.

The valve structure 48 includes a valve plate 53 and inlet and outlet valves 54 and 55, respectively. The valves 54 and 55 control the flow of refrigerant through passages 56 and 57 formed in the plate 53 between the chambers 51 and 52 and the cylinder 44. The operation and construction of a valve structure of the type shown at 48 is well known in the art and it is, therefore, not necessary to further describe its construction and operation. It will be understood that the specific form of compressor valve structure forms no part of my invention and that other valve arrangements may be employed.

The apparatus described in the foregoing operates on the well known compressor-condenser-expander refrigerating cycle wherein refrigerant vaporized at relatively low pressure in the low temperature evaporator 26 is drawn into the cylinder 44 through the conduit 35 and valve 54 as the piston moves downwardly. As the piston 46 passes beneath the port 45, refrigerant vaporized at relatively high pressure in the evaporator 25 enters the cylinder 44 through the conduit 34 and port 45 and compresses the low pressure gas in the cylinder 44 to a value substantially equal to the value of the higher pressure gas. Accordingly, the vaporized refrigerant is withdrawn from both evaporators 25 and 26 and the density of the gas in the cylinder 44 at the beginning of the compression stroke is substantially equal to the density of the higher pressure gas withdrawn from the high temperature evaporator 25.

The gas compressd in the cylinder 44 by the piston 46 is discharged through the valve 55 and the conduit 37 into the condenser 36, wherein it is cooled by the fan 38 and is condensed at relatively high pressure. This type of compressor is inherently efficient for two temperature operation as relatively high density gas is compressed at all times. The density of the gas in the cylinder at the beginning of the compression stroke is dependent upon and is substantially equal to the density of the higher pressure vapor withdrawn from the evaporator 25. The amount of higher density vapor drawn into the cylinder of a ported cylinder compressor is governed by the density of the lower density gas. An increase in density of the low pressure gas reduces the amount of high density gas drawn into the cylinder and, conversely, a reduction in density thereof increases the amount of high density gas which may be admitted to the cylinder for mixture with the low density gas. Further reference to this inherent operating characteristic of a ported cylinder compressor will be made in the description of the operation of the present embodiment.

Refrigerant condensed in the condenser 36 is supplied to the evaporators 25 and 26 through respective capillary tubes 61 and 62. The tubes 61 and 62 are secured in heat transfer relation with the suction conduits 35 and 34 for the same purpose as described in conection with the first embodiment.

As described heretofore, the flow of refrigerant through a capillary tube is determined by the pressure difference between the ends of the tube and the condition of fluid inside the tube. In the system shown in Figs. 2 and 3, the two capillary tubes 61 and 62 are selected to properly apportion the liquid refrigerant supplied to their respective evaporators. An increase in load on one evaporator unbalances the proper distribution and tends to cause a deficiency of refrigerant in the loaded evaporator and an overcharge in the other. The arrangement of the capillary tubes and the suction conduits as shown provides a means for decreasing this effect by changing the proportion of refrigerant going to the evaporators.

Assume that the thermostat 43 is calling for refrigeration and that the compressor 33 is operating to circulate refrigerant through the evaporators 25 and 26. Assume further that an increased heat load is applied to the lower temperature evaporator 26 causing its pressure to rise, whereby the pressure differential prevailing between the condenser 36 and the evaporator 26 is decreased. This would result in a reduction in the flow of refrigerant to the low temperature evaporator. At this time, the flow should be increased and not decreased. The proportion of refrigerant pumped from the high temperature evaporator 25 will be diminished due to the inherent operating characteristic of a ported cylinder compressor described heretofore. The temperature of the high temperature evaporator 25 will rise and the amount of gas pumped therefrom will gradually increase. Accordingly, the discharge or condensing pressure will rise and will increase the flow of refrigerant through both of the capillary tubes 61 and 62. This increased flow is desirable so far as the low temperature evaporator 26 is concerned but it is undesirable to increase the flow of refrigerant to the higher temperature evaporator 25, as at this time, its temperature is rising due to less gas being withdrawn therefrom.

It will be apparent under these conditions that the higher temperature evaporator may become overcharged with consequent passage of liquid through the suction conduit 34 to the compressor. This condition is obviated in my improved system as any liquid that enters the suction conduit of one evaporator is vaporized by the heat of the condensed refrigerant passing to the other evaporator. In the example under consideration, the cold liquid entering the conduit 34 from the high temperature evaporator 25 refrigerates the incoming refrigerant in the capillary tube 62 serving the low temperature evaporator 26 and thereby reduces the amount of gas in the incoming refrigerant and increases the flow thereof. The liquid vaporized in the conduit 34 raises the pressure in the high temperature evaporator 25 whereby the pressure differential between the condenser 36 and the high pressure evaporator 25 is reduced and thus further corrects the unbalance in the flow of refrigerant through the respective capillary tubes 61 and 62.

Assume that the temperature of the higher temperature evaporator 25 increases. The increased pressure of the vapor withdrawn through the conduit 34 by the compressor 33 causes an increased head or condenser pressure. This tends to increase the flow of refrigerant through both tubes 61 and 62. The increased flow through the tube 61 to the evaporator 25 is desirable but the increased flow through the tube 62 is undesirable. As the temperature of the vapor in the conduit 34 has increased, the flow of heat from the condensed refrigerant in the tube 62 is reduced. Accordingly, more gas is present in the tube 62 so that more resistance to the flow of refrigerant to the low temperature evaporator is offered. However, the increased head pressure may force sufficient refrigerant into the low temperature evaporator 26 to cause condensed refrigerant to enter the suction conduit 35. As the condensed refrigerant in the conduit 35 is then subjected to the relatively warm condensed refrigerant in the tube 61, it is rapidly vaporized and raises the pressure in the low temperature evaporator 26, thereby reducing the pressure differential along the tube 62 and retarding flow therethrough.

The condensed refrigerant in the tube 61 is refrigerated by the vaporizing refrigerant in the conduit 35 so that the gas content of the refrigerant in the tube 61 is reduced and the amount of refrigerant delivered to the evaporator 25 is increased. The amounts of refrigerant supplied to the evaporators 25 and 26 are now adjusted to the change in load. The flow of refrigerant to both evaporators 25 and 26 will be adjusted in response to a reduction in the heat load on either evaporator, the influences effecting such adjustment being the reverse of those described heretofore in connection with increases in the heat load on the evaporators.

It will be apparent from the foregoing that changes in load and temperature of an evaporator tend to destroy the proper apportionment of refrigerant to the evaporators where fixed orifice expansion devices are employed. I have corrected this undesirable operating condition by effecting the delivery of refrigerant to the evaporators through refrigerant supply conduits or tubes that are disposed in heat transfer relation with the suction conduits whereby a change in load on one evaporator reacts on the supply of refrigerant to another evaporator to prevent the supplying of an excess of refrigerant to the other and a shortage of refrigerant to the evaporator affected by the load change.

Throughout the specification and claims I have referred to a capillary tube or device. In defining this expression, I desire it to be understood that it means a flow restricting device having an elongated passage of relatively small area.

While I have shown my invention in several forms, it will be obvious to those skilled in the art that it is not so limited, but is susceptible of various other changes and modifications without departing from the spirit thereof, and I desire, therefore, that only such limitations shal. be placed thereupon as are imposed by the prior art or as are specifically set forth in the appended claims.

What I claim is:

1. The method of refrigerating a plurality of evaporators, which comprises vaporizing refrigerant in the evaporators, withdrawing the vaporous refrigerant from the evaporators, condensing the withdrawn refrigerant, conveying the condensed refrigerant to the evaporators in parallel and varying the heat content of the condensed refrigerant supplied to an evaporator in response to variations in the temperature of the vaporous refrigerant withdrawn only from another evaporator.

2. The method of refrigerating a plurality of evaporators, which comprises vaporizing refrigerant in the evaporators, withdrawing the vaporous refrigerant from the evaporators, condensing the withdrawn refrigerant, conveying the condensed refrigerant to the evaporators and transferring heat from the condensed refrigerant supplied to only one of the evaporators to the vaporous refrigerant withdrawn from another of the evaporators.

3. The method of refrigerating first and second evaporators which comprises vaporizing refrigerant in the evaporators, withdrawing the vaporous refrigerant from the evaporators, compressing the withdrawn refrigerant, condensing the compressed refrigerant, conveying the condensed refrigerant to the evaporators, and reducing the pressure of the condensed refrigerant during its conveyance to the evaporators in an elongated passage of relatively small flow area, and transferring heat from the condensed refrigerant conveyed to the first and second evaporators to the vaporous refrigerant withdrawn from the second and first evaporators, respectively.

4. In refrigerating apparatus, the combination of first and second evaporators, means for withdrawing refrigerant vaporized in the evaporators, means for condensing the withdrawn refrigerant, first and second capillary devices for conveying the condensed refrigerant to the respective evaporators, and means for transferring heat from the condensed refrigerant conveyed by the first and second capillary devices to the refrigerant withdrawn from the second and first evaporators, respectively.

5. In refrigerating apparatus, the combination of first and second evaporators, a compressor for withdrawing vaporized refrigerant from the evaporators, first and second conduits for conveying the vaporized refrigerant from the first and second evaporators to the compressor, means for condensing the withdrawn refrigerant and first and second capillary tubes for conveying the condensed refrigerant to the respective first and second evaporators, said first and second capillary tubes being disposed in heat transfer relation with said second and first conduits, respectively.

6. In refrigerating apparatus the combination of relatively high and low temperature evaporators, means for withdrawing vaporous refrigerant from the evaporators, means for condensing the withdrawn refrigerant, first and second capillary tubes for conveying the condensed refrigerant to the high and low temperature evaporators, respectively, means for transferring heat from the first capillary tube to the vaporous refrigerant withdrawn from the low temperature evaporator and means for transferring heat from the second capillary tube to the vaporous refrigerant withdrawn from the higher temperature evaporator.

7. In refrigerating apparatus the combination of relatively high and low temperature evaporators, first and second conduits for conveying vaporous refrigerant from the high and low temperature evaporators, means for condensing the vaporous refrigerant, a first capillary tube disposed in heat transfer relation with the second vapor conduit for conveying condensed refrigerant to the higher temperature evaporator and a second capillary tube disposed in heat transfer relation with the first vapor conduit for conveying condensed refrigerant to the low temperature evaporator.

8. In refrigerating apparatus, the combination of relatively high and low temperature evaporators, means for withdrawing refrigerant vaporized in the evaporators, means for condensing the withdrawn refrigerant, first and second capillary tubes for conveying the condensed refrigerant to the high and low temperature evaporators, respectively, and means responsive to a condition of the refrigerant withdrawn from one of the evaporators for varying the condition of the condensed refrigerant in the capillary tube serving the other evaporator.

9. In refrigerating apparatus, the combination of relatively high and low temperature evaporators, first and second conduits for conveying vaporous refrigerant from the high and low temperature evaporators, respectively, means for condensing the refrigerant conveyed by said conduits, first and second capillary tubes for conveying the condensed refrigerant to the respective high and low temperature evaporators, and means for varying the condition of the refrigerant in the first and second capillary tubes in response to the condition of the refrigerant in the second and first conduits, respectively.

10. In refrigerating apparatus, the combination of relatively low and high temperature evaporators, a compressor mechanism having first and second inlet ports for refrigerant vaporized in the low and high temperature evaporators, respectively, a condenser for condensing vapor compressed by the compressor, first and second means for conveying the condensed refrigerant to the low and high temperature evaporators and means for varying a condition of the condensed refrigerant conveyed by said first and second conveying means in response to variations in the condition of the refrigerant vaporized in the high and low temperature evaporators, respectively.

11. In refrigerating apparatus, the combination of relatively low and high temperature evaporators, a compressor mechanism having first and second inlet ports for refrigerant vaporized in the low and high temperature evaporators, respectively, a condenser for condensing vapor compressed by the compressor, first and second means for conveying the condensed refrigerant to the low and high temperature evaporators and means for transferring heat from the condensed refrigerant conveyed by the said first and second conveying means to the refrigerant vaporized in the high and low temperature evaporators, respectively.

12. In two-temperature refrigerating apparatus, the combination of relatively high and low temperature evaporators, a compressor having a cylinder and a piston therein, means for reciprocating the piston in the cylinder, said cylinder having a valved inlet adjacent an end thereof and an inlet port spaced from the valve inlet and opened and closed by the piston, a first conduit for conveying refrigerant vaporized in the low temperature evaporator to said valved inlet, a second conduit for conveying refrigerant vaporized in said high temperature evaporator to said inlet port, means for condensing the refrigerant compressed by the compressor, a capillary tube for conveying condensed refrigerant to the low temperature evaporator and disposed in heat transfer relation with said second conduit and a second capillary tube for conveying condensed refrigerant to the high temperature evaporator and disposed in heat transfer relation with said first conduit.

13. In refrigeration apparatus, the combination of a plurality of evaporators, a conduit associated with each evaporator for withdrawing variable temperature refrigerant vapor therefrom, means for condensing said withdrawn refrigerant vapor and for supplying condensed refrigerant to said evaporators, flow-retarding means associated with each evaporator for controlling the amount of refrigerant supplied thereto, the amount of refrigerant passing through said flow-retarding means being controlled by the temperature thereof, each of said flow-retarding means being in heat exchange relation with one only of said variable temperature conduits other than the conduit of the evaporator with which that particular flow-retarding means is associated, whereby the flow-retarding effect of said flow-retarding means is varied inversely with the temperature of its associated conduit.

LESLIE B. M. BUCHANAN.